UNITED STATES PATENT OFFICE.

EDMUND S. SMITH AND FRANK J. TONE, OF NIAGARA FALLS, NEW YORK, ASSIGNORS TO THE CARBORUNDUM COMPANY, OF NIAGARA FALLS, NEW YORK, A CORPORATION OF PENNSYLVANIA.

SILICON-CARBID ARTICLE AND METHOD OF MAKING THE SAME.

1,058,800.     Specification of Letters Patent.     Patented Apr. 15, 1913.

No Drawing.     Application filed April 26, 1912. Serial No. 693,379.

*To all whom it may concern:*

Be it known that we, EDMUND S. SMITH and FRANK J. TONE, residents of Niagara Falls, in the county of Niagara and State of New York, have invented a new and useful Improvement in Silicon-Carbid Articles and Methods of Making the Same, of which the following is a full, clear, and exact description.

Our invention relates to silicon carbid articles, particularly those used as refractory material or electric resistances.

It has long been known that silicon carbid possesses valuable refractory properties; but its low thermal resistivity makes it a fairly good conductor and thus prevented its entrance into a large field of usefulness.

Our invention is designed to overcome this difficulty and to give a new silicon carbid material which will have a higher resistance to heat conduction and is therefore valuable for refractory purposes as well as for electrical resistance devices and other uses.

We have discovered that when porous carbonaceous material, as for example carbonized wood is treated with silicon-containing vapors, the carbon is converted *in situ* into silicon carbid; and if the temperature is not carried too high nor the reaction continued too long, the silicon carbid so formed will retain the physical structure and porosity of the original carbon structure, giving it new and valuable properties.

In carrying out our process in a preferred form, we take a mixture of the following constituents by weight: 80 parts pulverized coke, 60 parts silica sand and 10 parts sawdust. This mixture is placed in an electric furnace, preferably of the granular core resistance type well known in the manufacture of silicon carbid and such as shown in the U. S. Patent No. 560,291, granted on May 19, 1896 to E. G. Acheson.

Blocks or pieces of wood are buried in and entirely surrounded by the mixture, this being placed preferably at a distance of from 2 to 3 inches from the core. The furnace is then operated in the ordinary way employed in the manufacture of silicon carbid until there is formed around the core a zone of crystalline silicon carbid which extends outwardly to the points where the blocks of wood are placed, but does not include them. Under these conditions the wood is first thoroughly carbonized and the volatilized silica or other silicon-containing combined vapors circulating freely through the porous mixture then re-act with the porous carbon to convert it into silicon carbid of very high and uniform porosity without materially changing the shape, physical structure or general texture. It is important that the temperature shall not be carried too high and that the silicidizing action shall not be too long continued, since if these conditions are not carried out, the carbon will be changed into a dense form of silicon carbid lacking the peculiar qualities of the grade we are able to produce.

The porous silicon carbid article thus produced shows no crystalline formation to the naked eye or even under a microscope of low power. If crystals exist, as is possible, they are of microscopic size; and the product appears to be amorphous.

In color the product is generally of a light, delicate green; in porosity and texture it resembles charcoal. A typical analysis follows:

| | |
|---|---:|
| Silicon carbid | 96.00 |
| Free silica | 2.44 |
| Iron and aluminum oxids | 1.56 |
| | 100.00 |

The product has the same chemical properties as ordinary crystalline carbid except that it is more susceptible to oxidation at high temperatures. It has about the same specific gravity as crystalline silicon carbid; but its apparent density is about 0.27 grams per cubic centimeter, which is well below that of any form of silicon carbid heretofore produced. This apparent density is always below 0.40. The material has special application as a refractory, combining to a degree that no other substance does, a high resistance to fusion and a high resistance to heat conduction. It is a poor conductor of electricity and can be used, for example, in electrical resistance devices. Owing to its ultimate fineness of particle and its uniform porous nature, it is a very poor conductor of heat and this property makes it valuable as a heat insulating material.

Instead of using blocks of wood other materials may be used, such as cotton, paper, pulp, cellulose, lamp-black, coke and other substances may be used which have, in the carbonized state, a porous or finely divided structure or texture. With many such carbon-containing materials it is possible to produce similar forms of porous silicon carbid possessing the valuable properties of the silicidized carbon produced from the wooden blocks, as above described.

Many changes may be made in the form and arrangement of the furnace, the method of subjecting the carbon article to silicon-containing vapors, etc., without departing from our invention.

We claim:

1. As a new article of manufacture, porous silicon carbid which is non-crystalline under naked vision and is characterized by extreme fineness of particle and pore.

2. As a new article of manufacture, porous silicon carbid non-crystalline under naked vision, and of uniform porosity and low apparent density, said article being characterized by extreme fineness of particle and pore.

3. As a new article of manufacture, porous silicon carbid in masses of substantially uniform porosity, characterized by extreme fineness of particle and pore, said masses having an apparent density of less than 0.40.

4. As a new article of manufacture, porous silicon carbid, non-crystalline under naked vision, and having an apparent density of less than 0.40.

5. As a new article of manufacture, silicidized carbon, non-crystalline under naked vision of uniform porosity and low apparent density, said article being characterized by extreme fineness of particle and pore.

6. As a new article of manufacture, porous silicon carbid having a high resistance to heat conduction, said article being characterized by extreme fineness of particle and pore.

7. The method of making porous silicon carbid, consisting in subjecting porous carbonized matter to silicon-containing vapors at a temperature which converts the carbon into porous silicon carbid non-crystalline under naked vision.

8. The process of making porous silicon carbid, which consists in subjecting carbonaceous matter, which is porous after carbonization, to silicon-containing vapors at a temperature sufficient to convert the carbon into porous silicon carbid, non-crystalline under naked vision, but insufficient to convert it into dense silicon carbid or silicon carbid of a plainly crystalline formation.

9. The process of making a shaped porous silicon carbid article which consists in forming a similarly shaped article of carbonaceous matter, which is porous after carbonization, subjecting said carbon articles to silicon-containing vapors at a temperature sufficient to convert the article into porous silicon carbid corresponding in texture and porosity to the carbonized article, but insufficient to convert it into dense or plainly crystalline silicon carbid.

In testimony whereof, we have hereunto set our hands.

EDMUND S. SMITH.
FRANK J. TONE.

Witnesses as to Edmund S. Smith:
 OTIS HUTCHINS,
 ROY LINCOLN.

Witnesses as to Frank J. Tone:
 EARL H. FINNEGAN,
 J. RAFUSE.